Patented June 28, 1927.

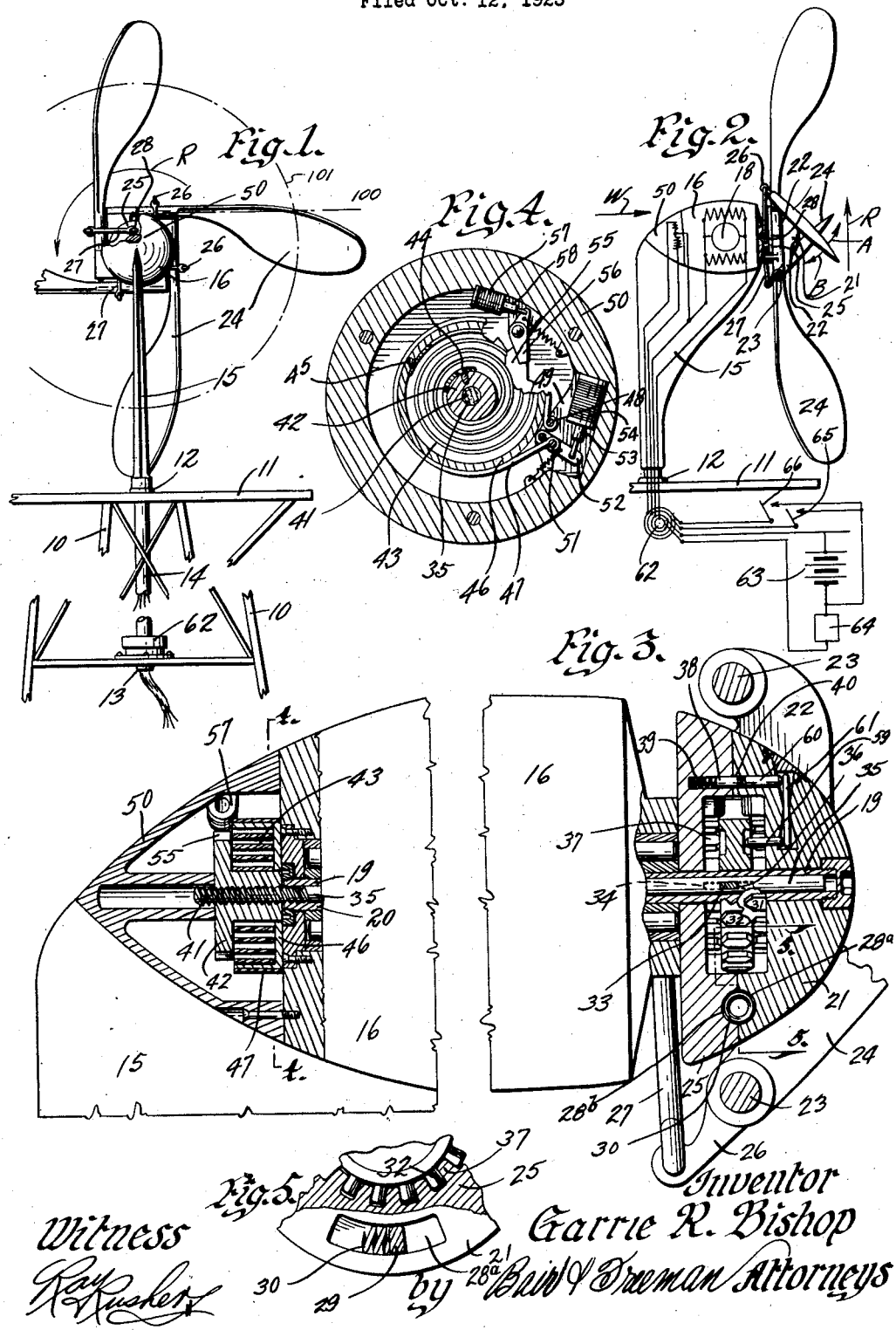

1,633,842

UNITED STATES PATENT OFFICE.

GARRIE R. BISHOP, OF RUNNELLS, IOWA.

WIND MOTOR.

Application filed October 12, 1925. Serial No. 62,013.

It is the object of my invention to provide a wind motor of simple, durable and comparatively inexpensive construction, having features of construction whereby the motor will generate more power with less wind, and will operate effectively in a higher wind than is possible with other wind motors.

A further object is to provide such a motor for supplying power for various purposes, which is automatically self-governed regardless of the speed of the wind or the proportions of the load within certain limits.

A further purpose is to provide such a motor having blades so constructed and mounted as to oscillate automatically in variable winds and to thus expose less surface in high winds, so that the motor is not likely to be blown down in high winds.

Still a further object is to provide means for starting or stopping my wind motor.

With these and other objects in view, my invention consists in the construction, arrangement and combination of the various parts of my wind motor, whereby the objects contemplated are attained, as hereinafter more fully set forth, pointed out in my claims, and illustrated in the accompanying drawings, in which:

Figure 1 is a front elevation of my device attached to a generator and mounted on a tower.

Figure 2 is a side view of the same.

Figure 3 is a vertical, longitudinal, section through my device, showing the various mechanisms in detail.

Figure 4 is a sectional view taken on the line 4—4 of Figure 3; and

Figure 5 is a sectional view taken on the line 5—5 of Figure 3.

In the accompanying drawings, I have used the reference numeral 10 to indicate generally a tower having a platform 11. The tower 10 may be of any suitable construction such as the tower of an ordinary farm windmill. Its purpose is merely to position my wind motor high enough so that the wind striking it will not be impeded by obstructions such as trees or buildings.

Rotatably mounted in bearings 12 and 13 on the tower 10 is a tubular shaft 14. A vane 15 is secured to the shaft 14 and has mounted thereon a generator casing 16. The vane 15, feathers my device into the wind, as does the tail of a windmill.

The armature 18 of the generator is mounted on a tubular shaft 19, which is mounted in bearings 20. Loosely mounted on the shaft 19 is a blade supporting hub 21, having blade supports 22 in which are mounted stub shafts 23. Blades 24 are mounted on the stub shafts so that they are free to turn thereon.

As will be seen from the showing in the drawings, for instance Figure 1, the blades have such shape that each blade has the greater part of its area on the following side of the line of the axis of its stub shaft. The line of this axis has been indicated in Figure 1 by the reference numeral 100. Likewise it will be observed from the drawing that a substantial portion of the area of the blade is on the following side of the axis line and likewise radially beyond the circumference line of a circle having its center in the stub shaft and its circumference passing through the axis line at the point where that line leaves the blade. The circle has been indicated in Figure 1 at 101.

In order to insure their turning in unison, I provide a disc 25 loosely mounted on the shaft 19. Each blade 24 has an arm 26 and the disc 25 has an eye 28 for each blade. The arms 26 are connected by links 27 to the eyes 28.

Thus it will be seen that I have provided an interconnection between all the blades, so that they will at all times have the same pitch. The shape of my blade is not necessarily that shown in the drawings, but may be of any practical shape where a greater portion of the blade is on one side of the axis established by the shaft 23.

A slot 28ª in the hub 21 receives a lug 29 on the disc 25. A spring 30 rests loosely in the slot 28ª and in the slot 28ᵇ in the disc 25 on one side of the lug 29. The purpose of this arrangement will later be described.

The parts thus far described form the essential elements of my invention with the exception of the tower 10 and generator. I will now describe their function and operation.

Assuming that the shaft 19 is connected to the hub 21 (this connection will later be described), it will be seen that rotation of the hub 21 will cause a corresponding rotation of the geenrator armature 18, With the blades in the position shown in Figures 1 and 2, the wind blowing in the direction of the arrow W will cause the hub 21 to rotate in the direction indicated by the arrows R. If the speed of the wind is equal to the speed of travel of the center of pressure of the blades 24, the blades will remain at 45° inclination, as shown.

If the wind increases the blades being free will rotate as indicated by the arrow A until they reach a point of balance.

If the wind decreases, the blades will rotate as indicated by the arrow B until a balance is automatically reached.

A variation in the load imposed on my wind motor will cause a slight variation in its speed. This varies the pressure on the blades due to rotation and they will then adjust themselves so as to again be built up or cut down to the governed speed. By the use of free blades as above described, I find that a maximum of efficiency can be obtained from my motor and that, due to the blades always being balanced, end thrust is greatly eliminated.

In order to operatively connect the generator to the hub 21, I provide teeth 31 in the hub. A toothed wheel 32 is slidably mounted on the tubular shaft 19 and has a key 33 extending through slots 34 in the shaft 19. A sliding shaft 35, inside the shaft 19, has a whole 36 through which the key 33 extends. Thus it will be seen that sliding the shaft 35 to the right, as shown in Figure 3, causes the generator to be connected to the hub 21. Teeth 37 similar to the teeth 31 are formed in the disc 25 and sliding the shaft 35 to the left, as shown in Figure 3, will cause them to mesh with the teeth on the wheel 32. This causes the load to be thrown on the disc 25, and this causes the blades 24 to rotate in the direction of the arrow A, the lug 29 slightly compressing the spring 30 (which acts as a limit for the rotation of the disc 25 relative to the hub 21).

When the blade 24 assumes a position with its plane parallel to the shaft 19, a spring backed plunger 38 in the recess 39 in the disc 25 drops into a hole 40 in the hub 21, thereby locking the blades in this position.

In Figure 3, in order to show the hole 40, it is moved radially on the hub 21 and is not in its true relative position.

It will be seen that when the blades are in the position just described, their edge is presented to the wind and it therefore has no turning effect on them and they slow down and stop. In order to actuate the shaft 35 for causing the toothed wheel 32 to selectively engage the teeth 31 or 37, I provide on it a screw-threaded portion 41 on which is a nut 42. A barrel spring 43 is connected at 44 to the nut 42 and at 45 to a drum 46 mounted for free rotation on the nut 42. A brake band 47 is secured at 48 to a bracket 49 in the cap 50 and at 51 to a pivoted arm 52. A plunger 53 extending into a solenoid 54 will cause the drum to stop rotation when current energizes the solenoid 54. This causes the spring 43 to wind up, because the shaft 35 is rotating clockwise in Figure 4, and the shaft 35 will screw through the nut 42, thereby causing the wheel 32 to engage the teeth 37 in the disc 25. Back rotation of the nut 42 is prevented by ratchet teeth 55 and a pawl 56.

When it is again desired to start the machine, a solenoid 57 is energized, which acting on a plunger 58, causes the pawl 56 to disengage the teeth 55, thereby allowing the spring 43 to turn the nut 42 counter-clockwise and slide the shaft 35 to the right in Figure 3.

To disengage the plunger 38, when it is desired to start the motor, pins 59 and 60 and a lever 61 are employed.

When the teeth 31 and 32 are nearly completely meshed, the plunger 38 has been pushed out of the hole 40 and the spring 30 by pushing the lug 29 causes the blades to have a slight pitch, which is enough to start their rotating until they have attained sufficient speed to become balanced.

Wires to the generator and solenoids run through the vane 15 to collector rings 62 and then to storage cells 63. A cutout 64 or other control device may be used in the circuit. Switches 65 and 66 are used to control the solenoid circuits.

Mechanical devices, such as a sleeve on the shaft 19, connected to the wheel 32 and having an annular groove in which a yoke may be placed for sliding the wheel 32 can be used instead of the mechanism in the cap 50.

It will be noted that the teeth 31, 32 and 37 are pointed. This is so that if the teeth 31 are out of line with the teeth 37, the teeth 32 will rotate the disc 25 to line the teeth up which are about to be engaged. The teeth 32 are always in mesh with the teeth 31 or 37 or both.

Some changes may be made in the construction and arrangement of the various parts of my wind motor without departing from the real spirit and purpose of my invention, and it is my intention to cover by my claims, any modified forms of structure or use of mechanical equivalents, which may be reasonably included within their scope.

I claim as my invention:

1. In a device of the class described, a shaft, a hub mounted thereon, a blade having at one end a stub shaft mounted rotatably in the hub, said blade having the greater part of its area on the following side of the line of the axis of the stub shaft and having a substantial area on such side and radially beyond the line of a circle having its center in the stub shaft and its circumference passing through the point where the axis line leaves the blade.

2. In a device of the class described, a shaft, a hub rotatably mounted on said shaft, blades having the greater part of their surface on one side of their axes, said blades having stub-shafts in the lines of their axes mounted in said hub, whereby said blades are free to oscillate relative to said hub, a disc loosely mounted on said shaft, means connected with said disc for causing said blades to oscillate in unison, and means for selectively causing said shaft to engage said hub or said disc.

3. In a device of the class described, a drive shaft, a hub loosely mounted thereon, stub shafts extending radially from said hub, said stub shafts terminating in blades oscillatably mounted, the greater area of each blade being on one side of said stub shaft, means for causing all of said blades to maintain the same pitch, and means for connecting said drive shaft selectively to said last mentioned means or to said hub.

4. In a device of the class described, a shaft, a hub rotatably mounted on said shaft, blades having the greater part of their surface on one side of their axes, stub shafts mounted in said hub and said blades on the axes of said blades whereby said blades are free to oscillate relative to said hub, a disc loosely mounted on said shaft, and means connected with said disc for rotating said blades in unison, and means for selectively causing said shafts to engage said hub or said disc, said means comprising a shaft slidably mounted, a nut for sliding said shaft, and means for actuating said nut.

Des Moines, Iowa, September 26, 1925.

GARRIE R. BISHOP.